J. WEBER.
LAWN TRIMMER.
APPLICATION FILED OCT. 8, 1908.
913,790.
Patented Mar. 2, 1909.
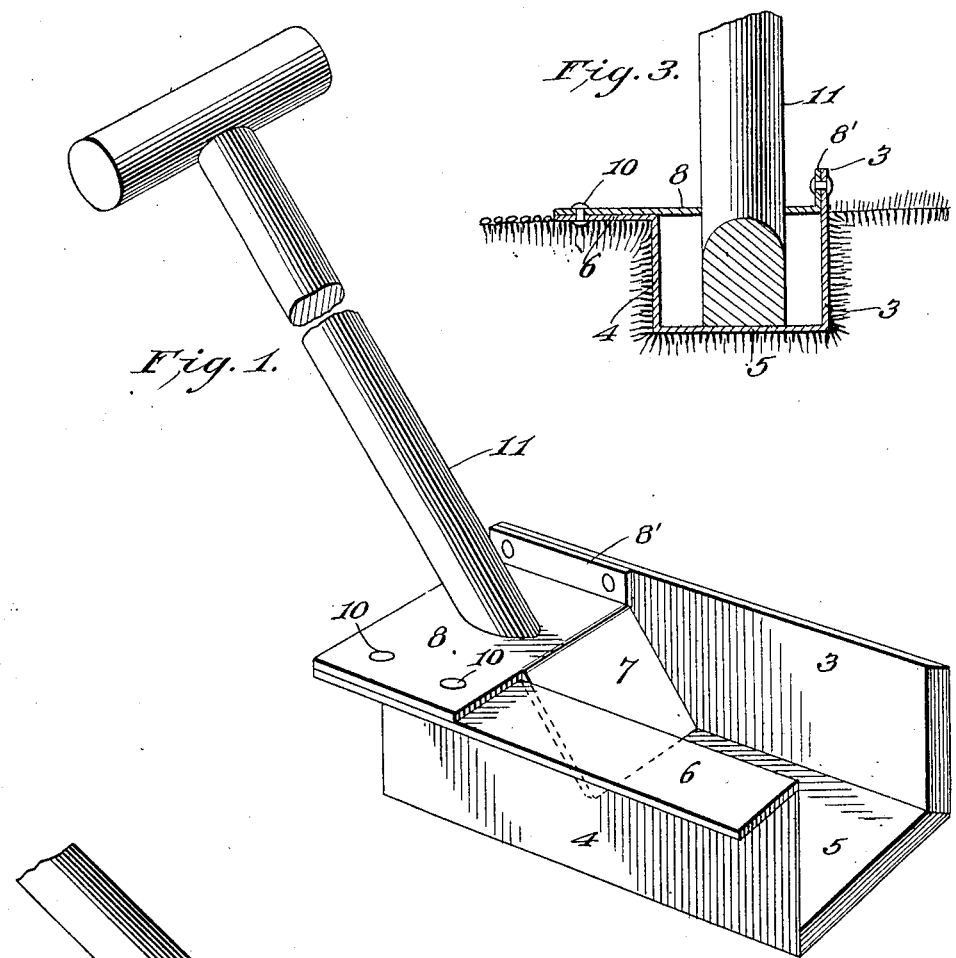
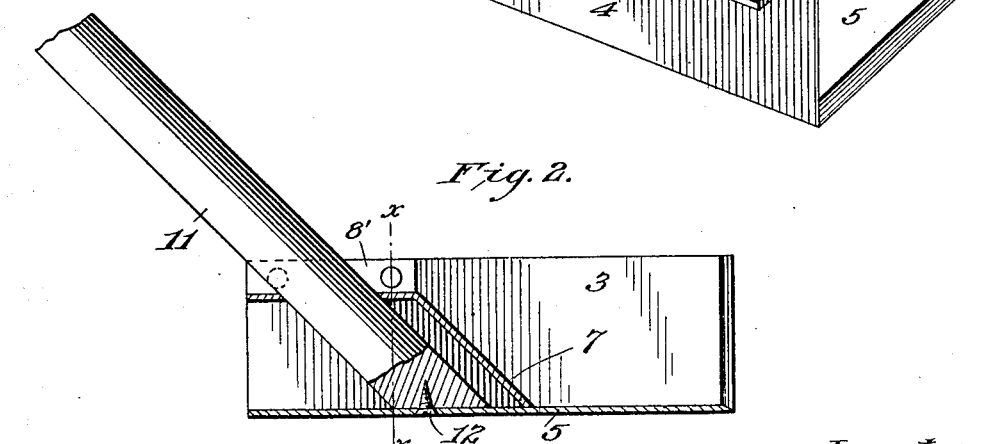
Witnesses
A. A. Olson
W. C. Smith
Inventor
Jacob Weber
By Joshua R. H. Potts
Attorney

UNITED STATES PATENT OFFICE.

JACOB WEBER, OF CHICAGO, ILLINOIS.

LAWN-TRIMMER.

No. 913,790. Specification of Letters Patent. Patented March 2, 1909.

Application filed October 8, 1908. Serial No. 456,830.

*To all whom it may concern:*

Be it known that I, JACOB WEBER, a citizen of the United States, residing at Chicago, in the county of Cook and State of Illinois, have invented certain new and useful Improvements in Lawn-Trimmers, of which the following is a specification.

My invention relates to gardening implements, and particularly to an edge trimmer for lawns, the object being to provide a device which may be used to cut the usual channel formed at the edge of a lawn next to a sidewalk or like elevation.

A further object is to provide a trimmer or cutter of the kind described which shall cut a channel of a constant width and depth, with but little labor and in a shorter time than is possible by means now used.

Broadly the invention consists of an arrangement of vertical blades or cutters operated by a handle and having a portion thereon which shall guide the blades properly as they are moved along the sidewalk and edge of the lawn.

In the drawings I have shown an embodiment of my invention wherein—

Figure 1, is a perspective view. Fig. 2, is a longitudinal section of the box, and Fig. 3, is a transverse section on line *x*—*x* of Fig. 2.

My implement consists of a three sided cutter formed of sheet metal. The cutter has two sides 3 and 4, and a bottom 5. The side 4 has also a right angularly bent portion 6. The two sides, bottom and angularly bent portion are all formed in one piece as shown in Fig. 3, and the forward edges of the sides 3, 4 and 5 are ground sharp to form cutting edges, thus providing three cutting blades. Mounted within the blades is the inclined plate 7 which is of the same width as the space between the walls 3 and 4, and is formed in one piece with the brace plate 8, which has at one end an upwardly turned flange 8' through which passes the bolts or rivets connecting this plate with the wall 3. At its other end the plate 8 projects over the flange 6 and is riveted thereto at 10, the wall 3 being higher than wall 4 for this purpose. The handle 11 is inclined and passes down through the upper bearing plate 8 and is attached to the floor of the box by means of a screw 12. At its upper end the handle is provided with the usual cross piece whereby the device may be pushed along.

In operation the horizontally extending flange or portion 6 rests upon the edge of the sidewalk, the vertically extending wall 5 thereof being moved against the edge of the walk as shown in Fig. 3. As the device is forced forward the cutting edges of the sides and bottom will cut a channel between the edge of the sidewalk and the lawn and will trim the sides of said channel. This channel it will be evident will be of a constant width and depth, provided the guide flange 6 is kept upon the face of the sidewalk or curb and the side 5 be kept against it outside the curb. The earth or turf cut out by the sides or cutting blades will be raised by the inclined plate 7, and pass over the rear of the implement.

The simplicity of my device is to be noted, it being made of two simple pieces of sheet metal easily formed, easily repaired and not likely to become broken, while the blades are easily cleaned and sharpened, or the handle removed and replaced.

Having thus described my invention what I claim as new and desire to secure by Letters Patent is:

In an implement of the character described, a cutter having two vertical sides and a bottom at right angles thereto, all knife-edged at their forward ends, one of said sides being turned outwardly at its upper edge to form a horizontal flange at right angles to said side, a cross plate having an upturned flange at one side attached to the rear of one of said vertical sides, and secured at its outer side to said flange, a handle projecting downwardly through said cross plate and attached to the bottom of the cutter, the forward edge of said cross plate being provided with a downwardly bent portion extending downwardly in front of said handle between the sides and reaching from side to side and contacting with the bottom, substantially as described.

In testimony whereof I have signed my name to this specification in the presence of two subscribing witnesses.

JACOB WEBER.

Witnesses:
ANNA L. EKVALL,
JANET E. HOGAN.